April 18, 1933. W. A. KARL 1,904,981
TIRE CONSTRUCTION
Filed Oct. 2, 1929 2 Sheets-Sheet 1

INVENTOR
WILLIAM A KARL.
BY
Ely & Barrow
ATTORNEYS.

Patented Apr. 18, 1933

1,904,981

UNITED STATES PATENT OFFICE

WILLIAM A. KARL, OF AKRON, OHIO, ASSIGNOR TO THE FIRESTONE TIRE & RUBBER COMPANY, OF AKRON, OHIO, A CORPORATION OF OHIO

TIRE CONSTRUCTION

Application filed October 2, 1929. Serial No. 396,725.

This invention relates to improvements in pneumatic tire construction, and more particularly to the bead construction thereof.

Heretofore, in building pneumatic tires it has been customary to surround the bead with a reinforcing ply or flipper strip which is adapted to lie between certain plies of the tire to secure the bead in the tire. This flipper strip has, so far as known, always been made of a strong woven rubberized fabric and is quite expensive. Strips of gum are required in such bead construction, these being applied along the edges of the flipper strip.

It has been found that bulk about the beads is more essential than strength, such bulk reducing the flexing of the tire adjacent the beads where flexing is undesirable.

It is an object of the invention to replace the strong, expensive woven fabric bead flipper strip with a more desirable and comparatively inexpensive material which will give the necessary bulk and which will firmly bond with the tire plies, and which does not require the use of gum strips at its edges.

A material having these desirable characteristics for use as a bead flipper has been developed by milling cotton fibres with a comparatively cheap rubber stock, the milled stock being calendered to the desired thickness which tends to align the fibres in the direction the stock is run through the calender. This aligning of the fibres in one direction gives strength to the fibre stock in that direction.

A form of the invention is shown in the attached drawings and described below, this specific disclosure being illustrative of one embodiment only of the invention, it being understood that the invention in its broadest aspects is not limited to details which may be set forth herein.

Of the accompanying drawings.

Figure 1:
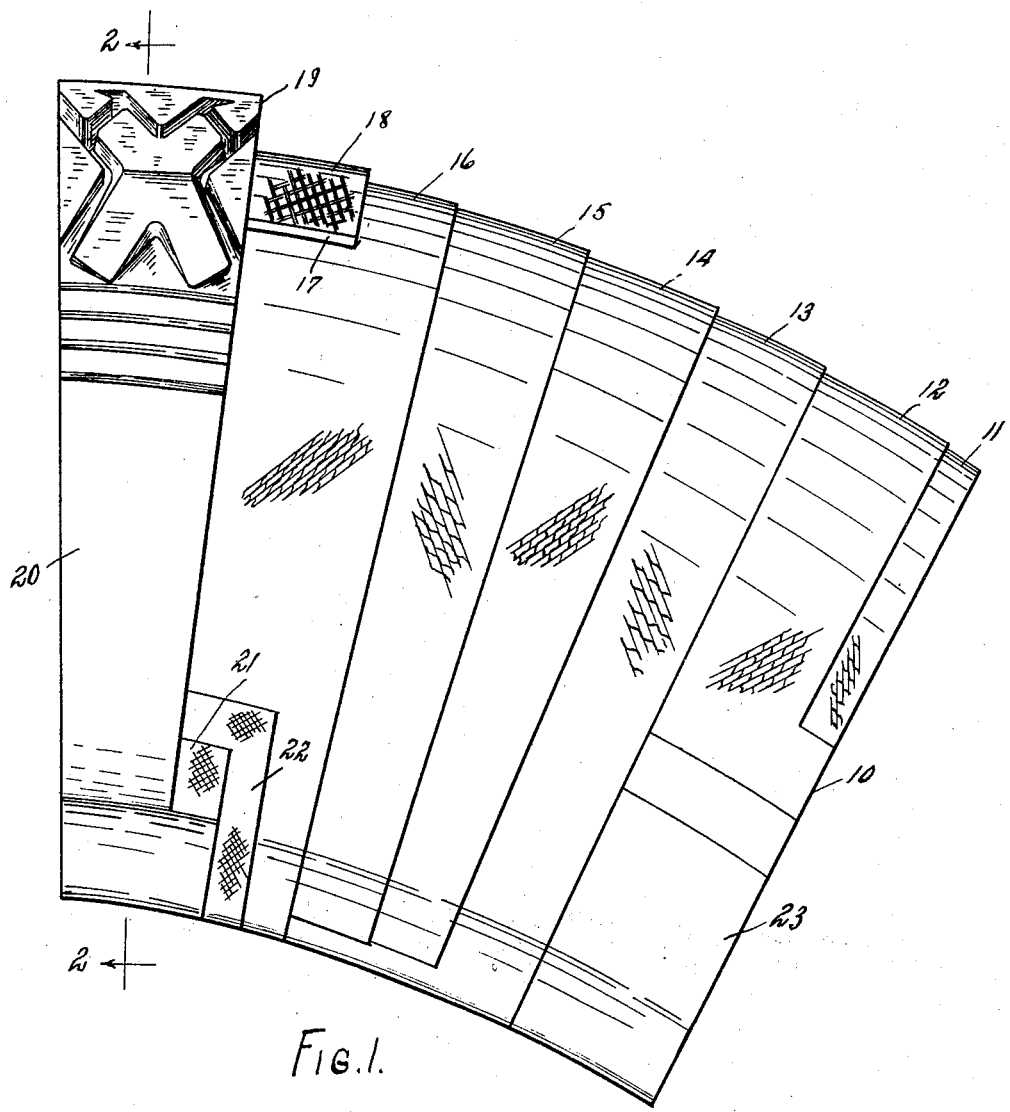
Figure 1 is a side elevation of a section of a tire embodying the invention, certain portions of which are cut away to more adequately show the construction thereof.
Figure 2:
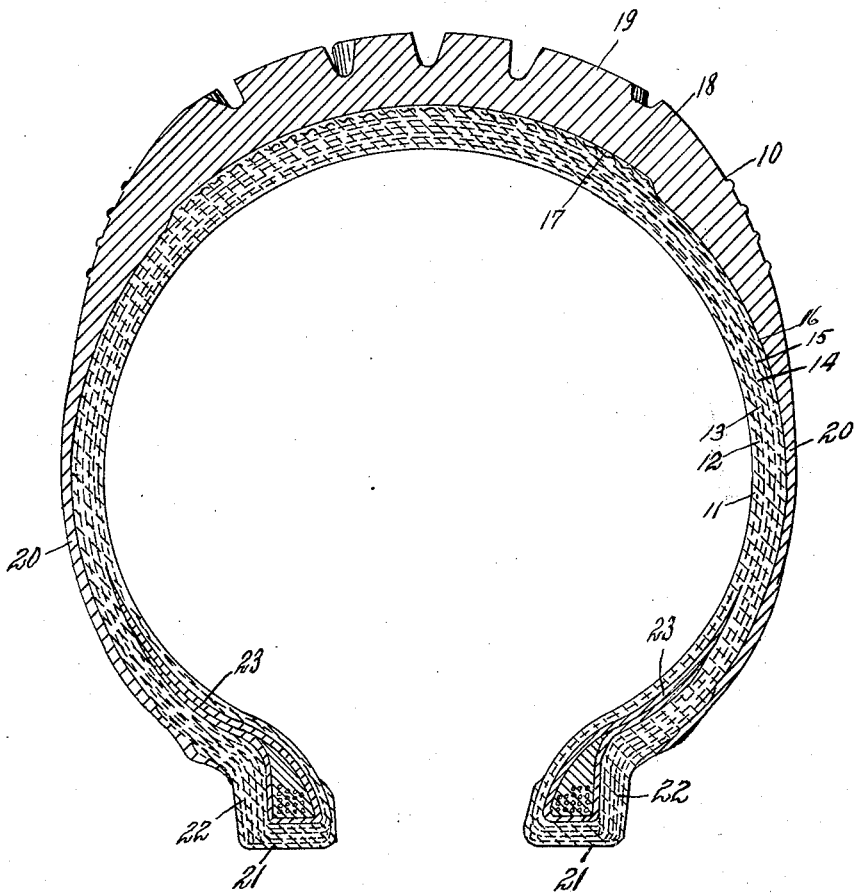
Figure 2 is a sectional view of Figure 1 taken on line 2—2 thereof.

A tire 10 in the embodiment of the invention shown includes plies 11, 12, 13, 14, 15 and 16, the usual cushion strip 17, breaker 18, tread 19, sidewalls 20, 20, chafer strips 21, a reinforcing strip 22 between the chafer strip 21 and the sixth ply 16, and the bead flipper 23.

The present invention is primarily concerned with the bead flipper 23. This flipper is formed of a strip of felted fibre stock of substantial tickness, in which the fibres are more or less aligned longitudinally of the material in the direction the felt is run when it is made, and is applied so that the fibres in the flipper extend circumferentially of the bead. This provides longitudinal strength in the flipper strip yet permits lateral give which is desirable in flipping the strip about the bead and in stitching the assembly in place on the tire carcass. As usual in bead flipper construction, the portion of the flipper 23 lying on the inside of the bead extends up into the sidewall of the tire carcass further than that on the outside of the bead.

The felted fibre bead flipper gives the bead assembly sufficient bulk. It has sufficient strength circumferentially for securing the bead properly while being adapted to be easily applied about the bead and stitched into place in the tire. It bonds effectively in the carcass of the tire and gum stripping about the edges of the flipper strip are not required.

It will be apparent from the foregoing that a greatly improved, yet more economical bead construction for tires has been provided by the invention. Obviously various modifications of the invention may be resorted to without departing from the spirit of the invention or the scope of the appended claims.

What is claimed is:

1. In a pneumatic tire construction, a tire carcass formed of a plurality of plies of suitable material, a pair of beads embedded at the inner periphery of said carcass, and a flipper about each bead and extending between certain of the plies into the sidewalls of the tire, said flipper being formed of strip material including fibres felted with rubber, in which the fibres extend circumferentially of the bead.

2. On bead constructions for pneumatic tires including plies of tire building material, the combination of a bead, a flipper about said bead having a portion extending up into the sidewall of the tire between certain of the plies thereof, said flipper comprising felted fibrous material.

3. On bead constructions for pneumatic tires including plies of tire building material, the combination of a bead, a flipper about said bead having a portion extending up into the sidewall of the tire between certain of the plies thereof, said flipper comprising felted fibrous material, the fibres of said material running circumferentially of the bead.

WILLIAM A. KARL.